(12) United States Patent
Chien et al.

(10) Patent No.: US 11,022,805 B2
(45) Date of Patent: Jun. 1, 2021

(54) HEAD-MOUNTED DISPLAY APPARATUS WITH OPTICAL ADJUSTMENT ELEMENT

(71) Applicant: Coretronic Corporation, Hsin-Chu (TW)

(72) Inventors: Hung-Ta Chien, Hsin-Chu (TW); Fu-Ming Chuang, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/716,420

(22) Filed: Dec. 16, 2019

(65) Prior Publication Data
US 2020/0209631 A1    Jul. 2, 2020

(30) Foreign Application Priority Data
Dec. 27, 2018    (CN) .......................... 201811607201.2

(51) Int. Cl.
*G09G 3/06*    (2006.01)
*G09G 3/22*    (2006.01)
(Continued)

(52) U.S. Cl.
CPC ........... *G02B 27/0172* (2013.01); *G02B 3/08* (2013.01); *G02F 1/133606* (2013.01); *G02F 1/133607* (2021.01)

(58) Field of Classification Search
CPC ......... G06F 3/011–015; G06F 2111/18; G09G 3/06–19; G09G 3/22–3291; G09G 3/34–3696; G09G 2300/0473
See application file for complete search history.

(56) References Cited

U.S. PATENT DOCUMENTS

| 4,704,004 A | 11/1987 | Nosker |
| 6,014,164 A * | 1/2000 | Woodgate ............... G02B 30/27 348/51 |

(Continued)

FOREIGN PATENT DOCUMENTS

| JP | H10319342 | 12/1998 |
| TW | 200540513 | 12/2005 |

OTHER PUBLICATIONS

"Search Report of Europe Counterpart Application", dated May 29, 2020, p. 1-p. 9.

*Primary Examiner* — Sanghyuk Park
(74) *Attorney, Agent, or Firm* — JCIPRNET

(57) ABSTRACT

A head-mounted display apparatus including a light source module, an optical adjustment element, a display module and a lens element is provided. The light source module provides an illumination beam. The optical adjustment element and the display module are disposed on a transmission path of the illumination beam, and the display module is configured to convert the illumination beam into an image beam. The optical adjustment element is located between the light source module and the display module. The lens element is disposed on a transmission path of the image beam, wherein a transmission direction of the maximum light-emitting intensity of the illumination beam transmitted from the light source module to the optical adjustment element is different to a transmission direction of the maximum light-emitting intensity of the illumination beam transmitted from the optical adjustment element to the display module.

11 Claims, 5 Drawing Sheets

(51) Int. Cl.
*G02B 27/01* (2006.01)
*G02B 3/08* (2006.01)
*G02F 1/13357* (2006.01)
*G02F 1/1335* (2006.01)

(56) References Cited

U.S. PATENT DOCUMENTS

| | | |
|---|---|---|
| 6,751,026 B2 | 6/2004 | Tomono |
| 2001/0030805 A1* | 10/2001 | Sawaki ................ G02B 3/0068 359/453 |
| 2004/0085648 A1 | 5/2004 | Tomono |
| 2007/0291355 A1 | 12/2007 | Tanijiri |
| 2008/0218658 A1* | 9/2008 | Kimura ................ G09G 3/3413 349/62 |
| 2018/0031842 A1* | 2/2018 | Tsai ...................... G06F 1/1637 |
| 2018/0338131 A1* | 11/2018 | Robbins ................. G06F 3/011 |

* cited by examiner

HEAD-MOUNTED DISPLAY APPARATUS WITH OPTICAL ADJUSTMENT ELEMENT

CROSS-REFERENCE TO RELATED APPLICATION

This application claims the priority benefit of China application serial no. 201811607201.2, filed on Dec. 27, 2018. The entirety of the above-mentioned patent application is hereby incorporated by reference herein and made a part of this specification.

BACKGROUND

Technical Field

The invention relates to an electronic apparatus, and particularly relates to a head-mounted display apparatus.

Description of Related Art

Generally, Virtual Reality (VR) head-mounted display is composed of a display and an eyepiece, and the display is generally an Organic Light-Emitting Diode display (OLED display) or a Liquid-Crystal Display (LCD). The display emits image light to image in the human eyes through the eyepiece. Therefore, when the human eyes view the image on the display through the eyepiece, the human eyes may view an enlarged virtual image.

However, in a current display, a light-emitting cone angle and a light-emitting direction of the display are not controlled, so that a part of the light is wasted, and stray light is produced, which decreases the image quality. Meanwhile, in the VR head-mounted display using a Fresnel lens as the eyepiece, although lightness and slimness of the VR head-mounted display are achieved, the image quality thereof is sacrificed.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a head-mounted display apparatus, which is adapted to improve light usage efficiency and reduce stray light.

Other objects and advantages of the invention may be further illustrated by the technical features broadly embodied and described as follows.

In order to achieve one or a portion of or all of the objects or other objects, an embodiment of the invention provides a head-mounted display apparatus including a light source module, an optical adjustment element, a display module and a lens element. The light source module is configured to provide an illumination beam. The optical adjustment element is disposed on a transmission path of the illumination beam. The display module is disposed on the transmission path of the illumination beam, and is configured to convert the illumination beam into an image beam. The optical adjustment element is located between the light source module and the display module. The lens element is disposed on a transmission path of the image beam, wherein a transmission direction of the maximum light-emitting intensity of the illumination beam transmitted from the light source module to the optical adjustment element is different to a transmission direction of the maximum light-emitting intensity of the illumination beam transmitted from the optical adjustment element to the display module.

Based on the above description, the embodiment of the invention has least one of following advantages or effects. In the head-mounted display apparatus of the invention, the optical adjustment element is disposed between the light source module and the display module, so that the illumination beam provided by the light source module passes through the optical adjustment element, and due to the optical effect of the optical adjustment element, the transmission direction of the maximum light-emitting intensity of the illumination beam passing through the optical adjustment element is different to the transmission direction of the maximum light-emitting intensity of the illumination beam before passing through the optical adjustment element. Therefore, the light usage efficiency may be further improved and stray light in image display is reduced without additionally configuring a light shielding element to shield or adsorb light.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
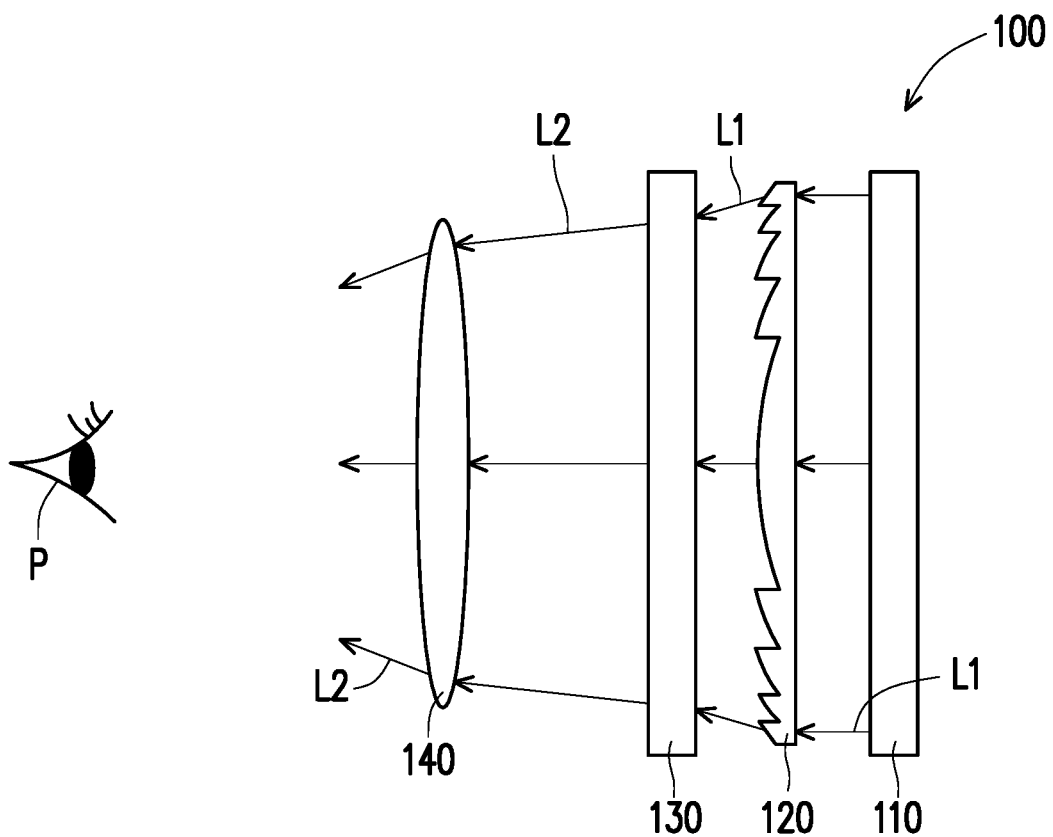
FIG. 1 is a schematic diagram of a head-mounted display apparatus according to an embodiment of the invention.

FIG. 1 is a schematic diagram of a head-mounted display apparatus according to an embodiment of the invention. Referring to FIG. 1, the embodiment provides a head-mounted display apparatus 100, which is adapted to improve light usage efficiency and meanwhile reduce stray light. In the embodiment, the head-mounted display apparatus 100 is a display device using a liquid crystal display.

To be specific, in the embodiment, the head-mounted display apparatus 100 includes a light source module 110, an optical adjustment element 120, a display module 130 and a lens element 140. The light source module 110 is configured to provide an illumination beam L1, and the illumination beam L1 is emitted from the light source module 110 and transmitted to pass through the optical adjustment element 120. The display module 130 is configured to receive the illumination beam L1 coming from the optical adjustment element 120 and convert the same into an image beam L2. Finally, the image beam L2 is transmitted to pass through the lens element 140 to reach an eye P of a user, and the user views an image through the image beam L2.

In the embodiment, the light source module 110 is, for example, a direct type backlight module capable of providing collimated light. However, in other embodiments, the light source module 110 may also be a side incident type backlight module, which is not limited by the invention. The light source module 110 is configured to provide the illumination beam L1 to the optical adjustment element 120, wherein a light cone angle of the illumination beam L1 emitted from the light source module 110 (i.e. a light-emitting angle of the light source module 110) is smaller than 25 degrees. In an exemplary embodiment, the light-emitting angle of the light source module 110 is smaller than 20 degrees.

The display module 130 is disposed on a transmission path of the illumination beam L1, and is configured to convert the illumination beam L1 into an image beam L2. In the embodiment, the display module 130 is, for example, a Liquid-Crystal Display (LCD) panel.

The lens element 140 is disposed on a transmission path of the image beam L2, and is configured to image the image beam L2 in the eye P of the user.

Figure 2:
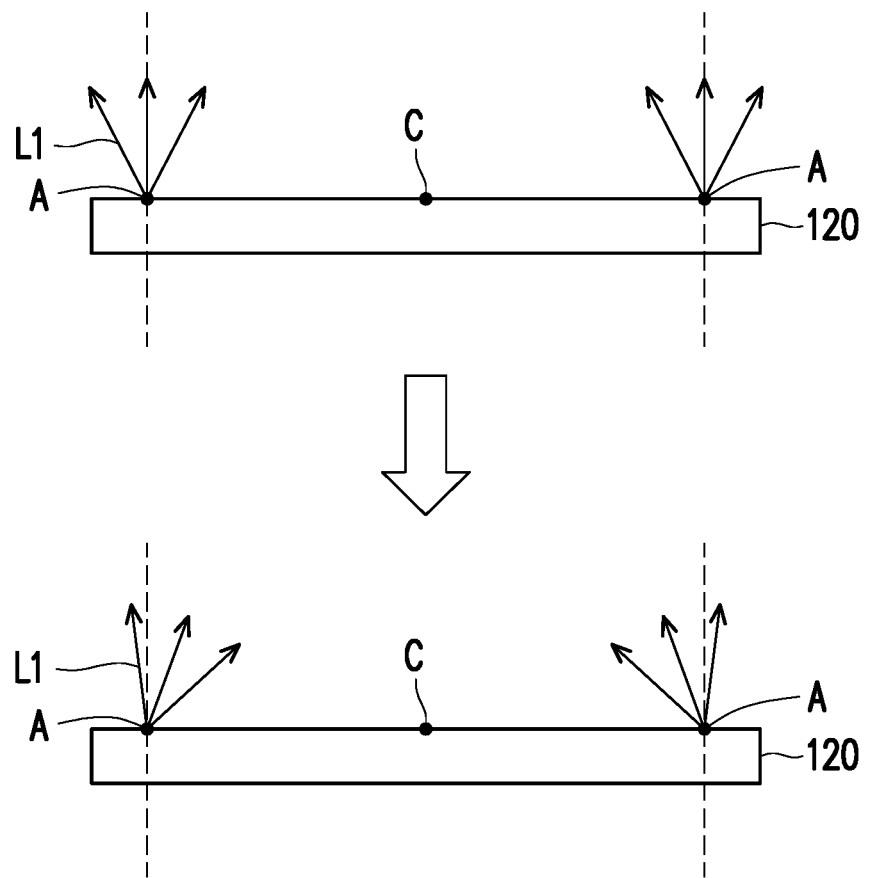
FIG. 2 is a schematic diagram of an optical path of an optical adjustment element according to an embodiment of the invention.

FIG. 2 is a schematic diagram of an optical path of the optical adjustment element according to an embodiment of the invention. Referring to FIG. 1 and FIG. 2, the optical adjustment element 120 of the embodiment may be at least applied to the head-mounted display apparatus 100 of FIG. 1, though the invention is not limited thereto. The following description is made based on the situation that the optical adjustment element 120 is applied to the head-mounted display apparatus 100 of FIG. 1.

The optical adjustment element 120 is disposed on the transmission path of the illumination beam, and the optical adjustment element 120 is located between the light source module 110 and the display module 130, and is configured to let the illumination beam L1 to pass through and adjust a transmission direction of the maximum light-emitting intensity of the illumination beam L1. Therefore, a transmission direction of the maximum light-emitting intensity of the illumination beam L1 transmitted from the light source module 110 to the optical adjustment element 120 is different to a transmission direction of the maximum light-emitting intensity of the illumination beam L1 transmitted from the optical adjustment element 120 to the display module 130.

In detail, in the embodiment, the optical adjustment element 120 adopts a Fresnel lens. However, in other embodiment, other optical element may also be adopted, which is not limited by the invention. Therefore, when the illumination beam L1 passes through the optical adjustment element 120, the transmission direction of the maximum light-emitting intensity of the illumination beam L1 transmitted from the optical adjustment element 120 to the display module 130 is deflected towards a central point C of the optical adjustment element 120, as that shown in FIG. 2. To be specific, a deflection angle of the transmission direction of the maximum light-emitting intensity of the illumination beam L1 transmitted from a reference point A of the optical adjustment element 120 to the display module 130 is positively correlated to a distance between the reference point A and the central point C. In other words, the illumination beam L passing through a light-emitting position farther from the central point C has a larger deflection angle. In the embodiment, the maximum deflection angle of the transmission direction of the maximum light-emitting intensity of the illumination beam L1 transmitted from the reference point A of the optical adjustment element 120 to the display module 130 is smaller than 30 degrees.

In this way, by using the optical adjustment element 120, the maximum light-emitting intensities of the illumination beam L1 provided by the light source module 110 may all be transmitted towards the central of the display module 130. Namely, the illumination beam L1 is adjusted to be transmitted towards a valid region. Therefore, light usage efficiency is further improved and stray light in image display is reduced without additionally configuring a light-shielding element to shield or adsorb light.

Figure 3:
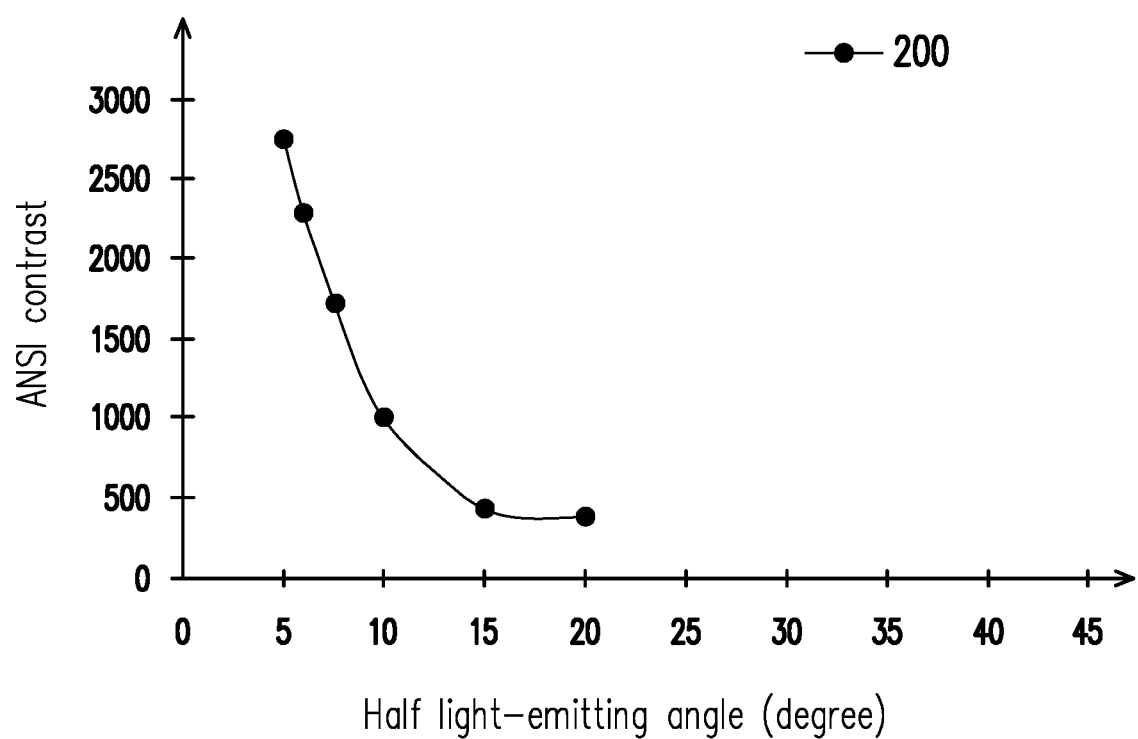
FIG. 3 is a diagram of an optical performance curve of a head-mounted display apparatus according to an embodiment of the invention.

FIG. 3 is a diagram of an optical performance curve of the head-mounted display apparatus according to an embodiment of the invention. Referring to FIG. 1 and FIG. 3, the optical performance curve of the head-mounted display apparatus of the embodiment may be at least applied to the head-mounted display apparatus 100 of FIG. 1, though the invention is not limited thereto. The following description is made based on the situation that the optical performance curve is applied to the head-mounted display apparatus 100 of FIG. 1. In the embodiment, by using the optical adjustment element 120 to adjust the illumination beam L1, besides that the light usage efficiency is improved and the stray light in image display is reduced, ANSI contrast is further improved. Referring to a curve 200 illustrated in FIG. 3, when a half light-emitting angle of the illumination beam L1 provided by the light source module 10 is smaller than 10 degrees (i.e. the full light-emitting angle is smaller than 20 degrees), good ANSI contrast and good optical performance are achieved.

Figure 4:
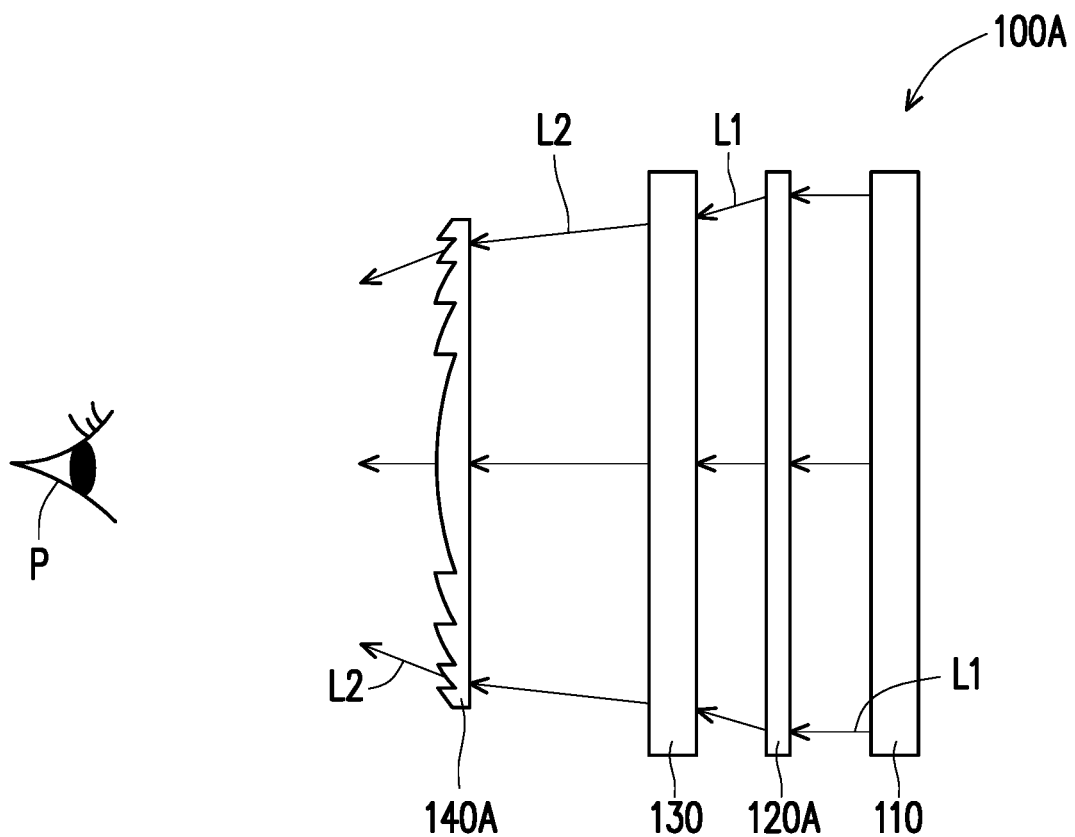
FIG. 4 is a schematic diagram of a head-mounted display apparatus according to another embodiment of the invention.

FIG. 4 is a schematic diagram of a head-mounted display apparatus according to another embodiment of the invention. Referring to FIG. 4, the head-mounted display apparatus 100A of the embodiment is similar to the head-mounted display apparatus 100 of FIG. 1, and differences there between are as follows. In the embodiment, the optical adjustment element 120A may be a tunable liquid crystal lens, and the lens element 140A is a Fresnel lens. In the embodiment, the optical adjustment element 120A of the tunable liquid crystal lens is adopted to adjust the illumination beam L1 to transmit towards the valid region. Therefore, the head-mounted display apparatus 100A using the Fresnel lens as the lens element 140A still has a good optical effect. In this way, the light usage efficiency is further improved and stray light in image display is reduced without additionally configuring a light-shielding element to shield or adsorb light.

Figure 5:
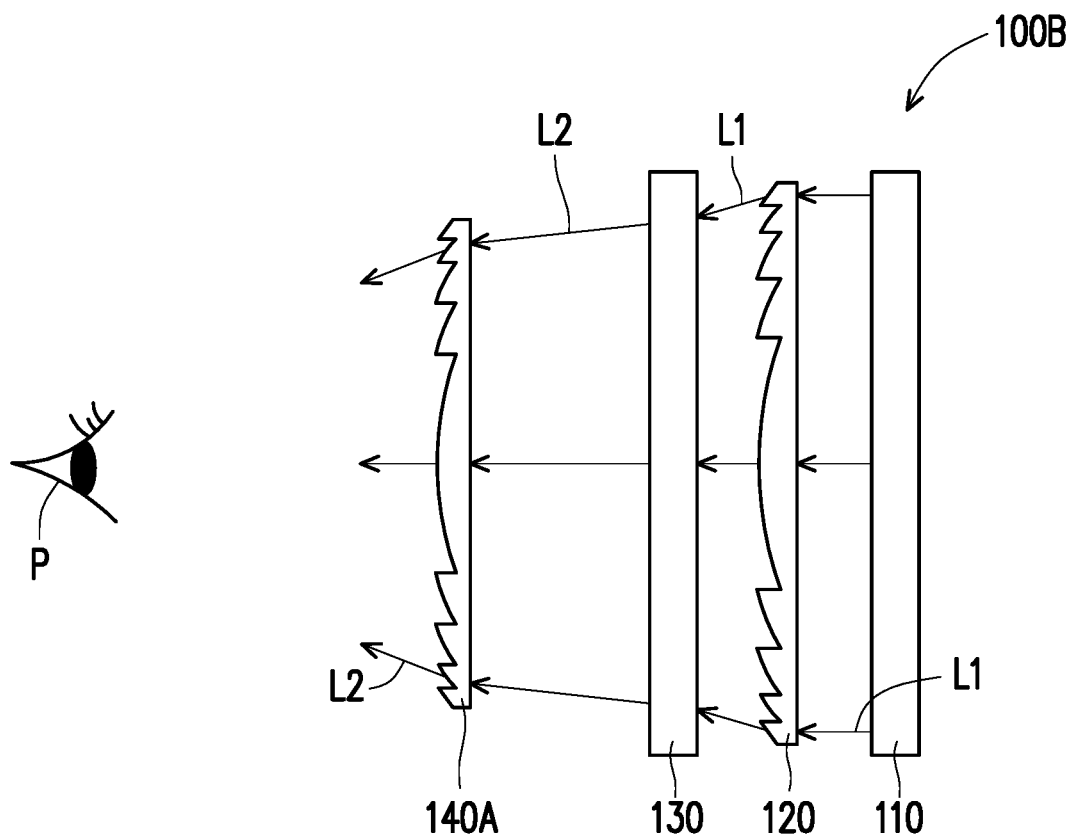
FIG. 5 is a schematic diagram of a head-mounted display apparatus according to another embodiment of the invention.

FIG. 5 is a schematic diagram of a head-mounted display apparatus according to another embodiment of the invention. Referring to FIG. 5, the head-mounted display apparatus 100B of the embodiment is similar to the head-mounted display apparatus 100A of FIG. 4, and a difference there between is as follows. In the embodiment, the optical adjustment element 120 is a Fresnel lens. In the embodiment, the optical adjustment element 120 using the Fresnel lens adjusts the illumination beam L1 to transmit towards the valid region. Therefore, the head-mounted display apparatus 100B using the Fresnel lens as the optical adjustment element 120 still has a good optical effect. In this way, the light usage efficiency is further improved and stray light in image display is reduced without additionally configuring a light-shielding element to shield or adsorb light.

In summary, the embodiment of the invention has least one of following advantages or effects. In the head-mounted display apparatus of the invention, the optical adjustment element is disposed between the light source module and the display module, so that the illumination beam provided by the light source module passes through the optical adjustment element, and due to the optical effect of the optical adjustment element, the transmission direction of the maximum light-emitting intensity of the illumination beam passing through the optical adjustment element is different to the transmission direction of the maximum light-emitting intensity of the illumination beam before passing through the optical adjustment element. Therefore, the light usage efficiency may be further improved and stray light in image display is reduced without additionally configuring a light shielding element to shield or adsorb light.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head-mounted display apparatus, comprising:
a light source module, configured to provide an illumination beam;
an optical adjustment element, disposed on a transmission path of the illumination beam;
a display module, disposed on the transmission path of the illumination beam, and configured to convert the illumination beam into an image beam, wherein the optical adjustment element is located between the light source module and the display module, and the display module is a transmissive optical element; and
a lens element, disposed on a transmission path of the image beam, wherein a transmission direction of a maximum light-emitting intensity of the illumination beam transmitted from the light source module to the optical adjustment element is different to a transmission direction of a maximum light-emitting intensity of the illumination beam transmitted from the optical adjustment element to the display module, wherein the optical adjustment element is an only one optical element between the light source module and the display module.

2. The head-mounted display apparatus as claimed in claim 1, wherein the transmission direction of the maximum light-emitting intensity of the illumination beam transmitted from the optical adjustment element to the display module is deflected towards a central point of the optical adjustment element.

3. The head-mounted display apparatus as claimed in claim 2, wherein a deflection angle of the transmission direction of the maximum light-emitting intensity of the illumination beam transmitted from a reference point of the optical adjustment element to the display module is positively correlated to a distance between the reference point and the central point.

4. The head-mounted display apparatus as claimed in claim 3, wherein a maximum deflection angle of the transmission direction of the maximum light-emitting intensity of the illumination beam transmitted from the reference point of the optical adjustment element to the display module is smaller than 30 degrees.

5. The head-mounted display apparatus as claimed in claim 1, wherein a light-emitting angle of the light source module is smaller than 25 degrees.

6. The head-mounted display apparatus as claimed in claim wherein the illumination beam provided by the light source module is collimated light.

7. The head-mounted display apparatus as claimed in claim 1, wherein the light source module is a direct type backlight module.

8. The head-mounted display apparatus as claimed in claim 1, wherein the optical adjustment element is a Fresnel lens.

9. The head-mounted display apparatus as claimed in claim 1, wherein the optical adjustment element is a tunable liquid crystal lens.

10. The head-mounted display apparatus as claimed in claim 1, wherein the display module is a liquid crystal display panel.

11. The head-mounted display apparatus as claimed in claim 1, wherein the lens element is a Fresnel lens.

* * * * *